UNITED STATES PATENT OFFICE 2,624,722

MODIFIED AND UNMODIFIED ACRYLONITRILE COPOLYMER COMPOSITIONS AND METHOD OF PREPARING THE SAME

Edward L. Kropa, Old Greenwich, and Arthur S. Nyquist, Cos Cob, Conn., assignors to American Cyanamid Company, New York, N. Y., a corporation of Maine No Drawing. Application February 15, 1949, Serial No. 76,656

8 Claims. (Cl. 260—85.5)

This invention relates to the production of new materials having valuable and characteristic properties that make them especially suitable for use in industry, for example in molding, laminating, coating and adhesive applications, and for other purposes. Thus, some of the new synthetic compositions broadly embraced by this invention are eminently suitable for use in the production of synthetic fibers.

The present invention is concerned more particularly with compositions of matter comprising the product of polymerization of a mixture of comonomers consisting of (1) acrylonitrile and (2) an unsaturated alcohol of the class consisting of allyl alcohol and methallyl alcohol (including mixtures thereof) in a weight ratio of from 25 to 95 parts (more particularly from 40 or 50 to 90 parts) of the acrylonitrile of (1) to from 75 to 5 parts (more particularly from 50 or 60 to 10 parts) of the unsaturated alcohol of (2); and is especially concerned with such compositions wherein the proportions of acrylonitrile and of the aforesaid unsaturated alcohol are such that the polymerization product contains from 15 to 30 percent by weight of the said unsaturated alcohol, the remainder being acrylonitrile. The scope of the invention also includes method features, for example the method of producing a new synthetic material which comprises polymerizing, in the presence of a polymerization catalyst, specifically a peroxide polymerization catalyst, a mixture of comonomers consisting of (1) acrylonitrile and (2) an unsaturated alcohol of the class consisting of allyl alcohol and methallyl alcohol, the mixture containing from 15 to 30 percent by weight of the unsaturated alcohol of (2), and the remainder of the comonomer in the mixture being acrylonitrile.

Polymeric acrylonitrile as ordinarliy produced is a relatively intractable material having a high softening point and which is capable of being dissolved only in a relatively few special solvents. The present invention is based on our discovery that acrylonitrile copolymerization products of lower softening point and of improved solubility characteristics can be produced by polymerizing a mixture of comonomers consisting of acrylonitrile and allyl or methallyl alcohol in weight ratios such as have been mentioned hereinbefore. The resulting copolymers are useful in the production of films, fibers, molding (moldable) compositions, etc. They may be used with other synthetic resins, e. g., urea-formaldehyde and melamine-formaldehyde resins, in the production of, for instance, molding compositions and liquid coating compositions. In such compositions the copolymeric acrylonitrile may be employed in a weight ratio of, for example, from about 5 to 90% (more particularly from about 5 or 10% to about 55%) of the copolymer to from about 95 to 10% (more particularly from about 45% to about 90 or 95%) of the urea-formaldehyde, melamine-formaldehyde or other base resin. Our new copolymers also may be employed as intermediates in the preparation of other synthetic materials which are useful in the plastics and coating arts, for instance in producing an acetal of the copolymer following the same general procedure commonly employed in forming an acetal of polyvinyl alcohol or of a partially hydrolyzed polyvinyl ester, e. g., polyvinyl acetate; and in producing a polymeric hydroxycarboxylic acid.

Various methods of polymerizing the mixture of monomers consisting essentially of (1) acrylonitrile and (2) allyl alcohol and/or methallyl alcohol may be employed including bulk, emulsion, bead and solution polymerization techniques. Different methods of preparing the copolymers are given by way of illustration in the examples which follow. If desired, the monomers may be copolymerized in the presence of a plasticizer for the copolymer in a manner similar to that disclosed and claimed in the copending application of Walter M. Thomas, Serial No. 780,309, filed October 16, 1947, now Patent No. 2,558,396, dated June 26, 1951. Other polymerization (copolymerization) methods, however, also may be employed, e. g., methods such as those described in U. S. Patents Nos. 2,140,048, 2,160,054, 2,194,354, 2,333,635, 2,436,926 and British Patent No. 586,881 with reference to the production of other polymerization products. The acrylonitrile copolymers may be produced in various molecular weights depending, for instance, upon the particular polymerization conditions employed, but ordinarily will be within the range of about 15,000 to about 300,000 or higher, as calculated from viscosity measurements using the Staudinger equation (reference: U. S. Patent No. 2,404,713).

In order that those skilled in the art better may understand how the present invention may be carried into effect, the following examples are given by way of illustration and not by way of limitation. All parts and percentages are by weight.

Example 1

| | Parts (approx.) |
|---|---|
| Acrylonitrile | 150.0 |
| Methallyl alcohol (2-methallyl alcohol) | 50.0 |
| Benzoyl peroxide | 0.4 |
| Aqueous solution containing about 2.5% of dioctyl sodium sulfosuccinate and about 1% of sulfonated castor oil | 150.0 |
| Water | 450.0 | were heated together under reflux, while agitating the mass, for approximately 25 hours. At the end of this period the unreacted monomers were removed by steam distillation, during which procedure a copolymer of acrylonitrile and methallyl alcohol coagulated and settled from the reaction mass. This copolymer, which was a white, tough product, was isolated, washed with both hot and cold water to remove soluble impurities, and dried for about 16 hours in a heated oven. The copolymer was quite rubbery and tough at about 60°–70° C. It was soluble in acetone and acetonyl acetone, and was swollen by methyl cyclohexanone. Transparent, colorless films were obtained upon casting solutions of the copolymer. Analysis indicated that the copolymer contained about 55.3% of combined acrylonitrile and about 44.7% of combined methallyl alcohol.

A portion of the copolymer was worked on differential rolls with polyacrylonitrile (polymeric acrylonitrile). The copolymer was compatible with the polyacrylonitrile, and the mixture formed a somewhat flexible sheet which had a good feeling to the touch. This sheet material could be ground to yield a molding composition adapted to be molded under heat and pressure to yield a molded article of a desired shape.

Any desired proportions of the allyl alcohol-acrylonitrile copolymer may thus be compounded with polyacrylonitrile to form a filled or unfilled molding composition, e. g., from about 10% to about 90% by weight of such a copolymer to from about 90% to about 10% by weight of polyacrylonitrile.

Example 2

| | Parts (approx.) |
|---|---|
| Acrylonitrile | 150.0 |
| Allyl alcohol | 50.0 |
| Benzoyl peroxide | 0.2 |
| Aqueous solution containing about 2.5% of dioctyl sodium sulfosuccinate and about 1% of sulfonated castor oil | 150.0 |
| Water | 450.0 | were heated together under reflux, while agitating the mass, for approximately 16½ hours to yield a copolymer of acrylonitrile and allyl alcohol. The unreacted monomers were removed by steam distillation. The copolymer was isolated from the reaction mass in the form of a white, powdery, granular material, which was washed first with water and then with denatured ethyl alcohol to remove soluble impurities, followed by drying in a heated oven.

Molding compositions can be produced from the dried copolymer by grinding it to a desired particle size. Dyes, pigments, plasticizers, mold lubricants, etc., may be incorporated into the molding composition as desired or as conditions may require. Molded articles are produced by molding the filled or unfilled molding compositions under heat and pressure, e. g., at 150–180° C. for from 1 to 5 minutes or more under a pressure of from about 3,000 to 10,000 pounds or more per square inch. Molding operations can be conducted more expeditiously if the polymeric granules are suitably performed prior to molding.

Example 3

| | Parts (approx.) |
|---|---|
| Acrylonitrile | 50.0 |
| Methallyl alcohol | 150.0 |
| Benzoyl peroxide | 0.4 | were heated together at 90° C., under reflux, for 30 hours. Unreacted monomers were removed by vacuum distillation, leaving a sticky, brown residue comprising a copolymer of acrylonitrile and methallyl alcohol. This product was soluble in acetone and, in the presence of methyl cyclohexanone, was compatible with a conventional butylated ureaformaldehyde resin dissolved in a butanol-xylene mixture. The resulting liquid coating composition was flowed upon a tin panel and baked thereon for 40 minutes at 150° C. to form a hard, mar-resistant, lustrous, baked finish on the panel.

Example 4

Same as Example 1 with the exception that the reaction mass was heated under reflux, with agitation, for about 39 hours. Also, the isolated and washed acrylonitrile-methallyl alcohol copolymer was dried by passing it through hot rolls, and thereafter was ground in a knife mill to yield a molding composition.

Example 5

| | Parts (approx.) |
|---|---|
| Acrylonitrile | 50.0 |
| Methallyl alcohol | 50.0 |
| Benzoyl peroxide | 0.2 |
| Aqueous solution containing about 10% of dioctyl sodium sulfosuccinate | 10.0 | were heated together under reflux, with agitation, for about 19½ hours, after which the reaction mass was allowed to stand at room temperature (about 25°–35° C.) for about 19 days. The unreacted monomers were removed by steam distillation, leaving a sticky residue comprising a copolymer of acrylonitrile and methallyl alcohol. This product may be used in the production of liquid coating compositions, for instance by blending with a liquid, butylated urea-formaldehyde resinous composition as described under Example 3. Or, it may be used as a modifier of melamine-formaldehyde resins to yield a copolymer-modified melamine-formaldehyde molding composition or coating composition.

Example 6

| | Parts (approx.) |
|---|---|
| Acrylonitrile | 100.0 |
| Methallyl alcohol | 100.0 |
| 5% aqueous solution of polyvinyl alcohol | 40.0 |
| Benzoyl peroxide | 0.4 |
| Water | 560.0 | were heated together under reflux at the boiling temperature of the mass for about 64 hours. The unreacted monomers were removed by steam distillation, and the coagulated copolymer of acrylonitrile and methallyl alcohol was isolated, washed and dried as described in Example 1.

Instead of copolymerizing allyl or methallyl alcohol with acrylonitrile by emulsion copolymerization technique as described in the foregoing examples, we may use other copolymerization methods.

*Example 7*

A copolymer of acrylonitrile and methallyl alcohol was prepared by heating for 48 hours, under reflux and with stirring, a mixture of the following ingredients:

|  | Parts |
|---|---|
| Acrylonitrile | 560.0 |
| Methallyl alcohol | 140.0 |
| Water | 2800.0 |
| Methyl cellulose (aqueous solution having a viscosity of 25 cp.) | 33.6 |
| Hydrogen peroxide (30% aqueous solution) | 17.5 |

The copolymer was separated, washed with dilute acetic acid and water, and finally dried.

This copolymer was used in the molding composition described below:

|  | Parts |
|---|---|
| Heat-curable melamine-formaldehyde resin | 22.5 |
| Acrylonitrile-methallyl alcohol copolymer | 7.5 |
| Calcined asbestos | 45.0 |

The above ingredients were mixed together and then milled for 2 minutes on hot rolls maintained at 110° C. The resulting sheets were broken up and pulverized in a rotary mill to obtain a substantially homogeneous molding powder. Portions of this powder were molded into discs and bars by heating for from 5 to 6 minutes at about 155° C. under a pressure of approximately 3750 pounds per square inch. The molded articles were hard and tough. The Izod impact strength was 0.296 ft. lb. per inch, the dielectric strength at 100° C. was 400 volts per mil and the arc resistance was 143 seconds.

The copolymers of this invention also may be used as intermediates in the production of other synthetic materials. This is shown by the following example which is illustrative of how an acetalized copolymer of acrylonitrile and allyl or methallyl alcohol may be produced.

*Example 8*

|  | Parts (approx.) |
|---|---|
| Acrylonitrile-methallyl alcohol copolymer of Example 1 | 3 |
| Acetone | 30 |
| Butyraldehyde | 3 |
| Aqueous hydrochloric acid (about 35% HCl) | 2 | were mixed together and allowed to stand at room temperature (about 25° C.) for six days. The butyraldehyde at first caused the copolymer to precipitate out of the acetone solution thereof, but on standing the precipitated copolymer slowly redissolved. At the end of the reaction period, the reaction product of the butyraldehyde with the acrylonitrile-methallyl alcohol copolymer had settled out as a cake on the bottom of the reaction vessel. The butyral of the acrylonitrile-methallyl alcohol copolymer was isolated from the reaction mass, washed and dried. It was insoluble in acetone whereas the original copolymer was soluble in acetone. Such acetalized copolymers may be used as adhesives, surface-protective coating compositions, wire enamels, etc., or as components of such compositions.

Instead of using an acrylonitrile-methallyl alcohol copolymer as in the above example, we may use an equivalent amount of an acrylonitrile-allyl alcohol copolymer; and, with both kinds of copolymers, we may use any other kind of an aldehyde or compound engendering an aldehyde, e. g., formaldehyde, paraformaldehyde, acetaldehyde, propionaldehyde, valeraldehyde, hexaldehyde, heptaldehyde, octaldehyde, nonaldehyde, acrolein, methacrolein, crotonaldehyde, etc. Acidic catalysts other than hydrochloric acid may be employed if desired, for instance sulfuric acid or other strong mineral acid, or an acidic salt, e. g., aluminum chloride, zinc chloride, etc. The reaction may be effected at temperatures ranging from room temperature up to the boiling temperature of the reaction mass at atmospheric pressure or at higher temperatures under superatmospheric pressure, and in the presence or absence of a solvent or diluent for the copolymer. It may be continued until only a relatively small number, e. g., about 10 or 20% of the hydroxyl groups in the copolymer have been replaced by acetal groups or, if desired, until all (i.e., 100%) of the hydroxyl groups have thus been replaced. It is usually desirable that at least 50%, say 60% to 100%, of the hydroxyl groups of the copolymer be replaced by acetal groups.

The copolymers of this invention also may be hydrolyzed, e. g., with the aid of 10–20% caustic soda solution at a temperature of the order of 80°–100° C., to yield polymeric hydroxycarboxylic acids. Such hydrolysis preferably is effected by adding the finely divided copolymer in small increments to the hot, stirred caustic soda solution. The hydrolysis products containing a substantial proportion of hydroxyl groups are water-insoluble. This characteristic permits them to be obtained in a form free from contamination of electrolytes employed in the hydrolysis.

We claim:
1. A composition of matter comprising the product of polymerization of a mixture of comonomers consisting of (1) acrylonitrile and (2) an unsaturated alcohol of the class consisting of allyl alcohol and methallyl alcohol in proportions such that the polymerization product contains from 15 to 30 per cent by weight of the said unsaturated alcohol, the remainder being acrylonitrile.

2. A method of producing a new synthetic material which comprises polymerizing, in the presence of peroxide polymerization catalyst, a mixture of comonomers consisting of (1) acrylonitrile and (2) an unsaturated alcohol of the class consisting of allyl alcohol and methallyl alcohol, the mixture containing from 15 to 30 percent by weight of the unsaturated alcohol of (2), and the remainder of the comonomer in the mixture being acrylonitrile.

3. A copolymer of a mixture of comonomers consisting of (1) acrylonitrile and (2) an unsaturated alcohol of the class consisting of allyl alcohol and methallyl alcohol in a weight ratio of 75 parts of the former to 25 parts of the latter.

4. A method as in claim 2 wherein the unsaturated alcohol of (2) is allyl alcohol.

5. A copolymer of acrylonitrile and 2-methallyl alcohol, the copolymer containing from 15 to 30 percent by weight of the 2-methallyl alcohol, the remainder being acrylonitrile.

6. A process for preparing a copolymer of acrylonitrile and 2-methallyl alcohol comprising polymerizing, in the presence of peroxide polymerization catalyst, a mixture of acrylonitrile and 2-methallyl alcohol, the mixture containing from 15 to 30% by weight of 2-methallyl alcohol, the remainder being acrylonitrile.

7. A process for preparing a copolymer of acrylonitrile and 2-methallyl alcohol comprising polymerizing in the presence of an organic peroxide polymerization catalyst, a mixture of acrylonitrile and 2-methallyl alcohol, the mixture containing from 15 to 30% by weight of 2-methallyl alcohol, the remainder being acrylonitrile.

8. A composition as in claim 1 wherein the unsaturated alcohol of (2) is allyl alcohol.

EDWARD L. KROPA.
ARTHUR S. NYQUIST.

REFERENCES CITED

The following references are of record in the file of this patent:

UNITED STATES PATENTS

| Number | Name | Date |
| --- | --- | --- |
| 2,332,900 | D'Alelio | Oct. 26, 1943 |
| 2,469,288 | Adelson | May 3, 1949 |
| 2,525,521 | Caldwell | Oct. 10, 1950 |

FOREIGN PATENTS

| Number | Country | Date |
| --- | --- | --- |
| 883,551 | France | Mar. 29, 1943 |